April 14, 1959 J. E. BRYDEN ET AL 2,882,401

FREQUENCY CONTROL SYSTEM

Filed March 3, 1955 3 Sheets-Sheet 1

INVENTORS
JOSEPH EASTO BRYDEN
FREDERICK CHARLES FLINT
HARRY DAVID HYAMSON
GEORGE FREDERICK SMALL

BY

ATTORNEY

April 14, 1959 J. E. BRYDEN ET AL 2,882,401

FREQUENCY CONTROL SYSTEM

Filed March 3, 1955 3 Sheets-Sheet 2

INVENTORS
JOSEPH EASTO BRYDEN
FREDERICK CHARLES FLINT
HARRY DAVID HYAMSON
GEORGE FREDERICK SMALL

BY

ATTORNEY

INVENTORS
JOSEPH EASTO BRYDEN
FREDERICK CHARLES FLINT
HARRY DAVID HYAMSON
GEORGE FREDERICK SMALL

ATTORNEY

United States Patent Office 2,882,401

Patented Apr. 14, 1959

2,882,401

FREQUENCY CONTROL SYSTEM

Joseph Easto Bryden, Harrow, and Frederick Charles Flint, Wembley, England, Harry David Hyamson, Mentone, Victoria, Australia, and George Frederick Small, Chesham, England, assignors to The General Electric Company Limited, London, England Application March 3, 1955, Serial No. 492,014

1 Claim. (Cl. 250—36)

Figure 1:
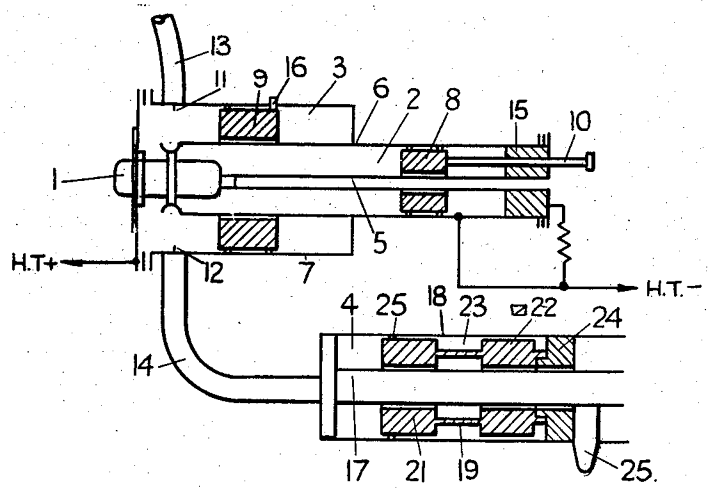

The present invention relates to electric oscillation generators.

It is well known to use the resonant frequency of a resonator, for example a cavity resonator, as the frequency reference for controlling the operating frequency of an oscillator. For this purpose a portion of the output from the oscillator is usually supplied to the cavity resonator and either the oscillator is frequency modulated at a predetermined frequency or the resonant frequency of the resonator is varied cyclically at a predetermined frequency. In either case the signal picked up by a probe or other coupling device associated with the resonant cavity is found to be amplitude modulated. This signal is passed to a detector, for example a crystal detector, so as to derive the amplitude modulation, and the component thereof having a frequency equal to the predetermined frequency is then utilised to tune the oscillation generator. The phase of the modulation determines whether the frequency of the oscillator, or its mean frequency, is greater or less than the resonant frequency of the cavity resonator, or its mean resonant frequency, as the case may be and the said component has zero amplitude when the oscillator is correctly tuned.

The present invention is more particularly concerned with oscillation generators in which, for the purpose of effecting automatic frequency control, a resonator has its resonant frequency varied cyclically, and it is one object of the present invention to provide an oscillation generator having a novel system of automatic frequency control.

According to the present invention an electric oscillation generator has an automatic frequency control system which utilises a resonator as the frequency reference, while there is means continuously to rotate a member in the electric or magnetic field of the resonator during operation of the system so as to cause the resonant frequency of the resonator to be varied cyclically over a range of values.

The resonator may, for example, be a cavity resonator or an enclosed co-axial line system. A cavity resonator is one adapted to be excited so as to operate effectively as a closed section of waveguide while an enclosed co-axial line system may be considered as a cavity which has a central conductor and which is arranged to be excited so as to operate as a length of co-axial line that is usually short-circuited at one end and open-circuited at the other.

According to a feature of the present invention, an electric oscillation generator comprises electrical means which is adapted to supply an electric oscillation and which may be tuned, a resonator which is either of the cavity type or an enclosed co-axial line system and to which is arranged to be applied a portion of the electric oscillation from said electrical means, means to rotate a member in the said resonator at a relatively slow speed so as to cause the instantaneous resonant frequency of the resonator to be varied, and means to tune the said electrical means in dependence upon the component of the amplitude modulation on the oscillatory electric or magnetic field in the resonator that has a frequency equal to the frequency at which the resonant frequency of the resonator is varied so as to cause the frequency of the said oscillation applied to the resonator to become substantially equal to the mean resonant frequency thereof.

Preferably an electric motor is arranged to rotate this member at a predetermined speed. The means to tune the electrical means may comprise a two-phase electric motor, the arrangement being such that during operation one phase winding is supplied continuously with alternating current while the other phase winding is supplied with a signal derived from the resonator. The phase of this signal depends upon whether the frequency of the oscillation applied to the resonator is greater or less than the mean resonant frequency thereof and has zero amplitude when they are equal. The two-phase motor is therefore normally stationary but is caused to operate when it is necessary to retune the electrical means. The electrical means may be formed by an oscillator the operating frequency of which is determined by a co-axial line which has a shorting bridge, the position of this bridge being varied by operation of the two-phase motor. This co-axial line may constitute the main tuning of the oscillator or it may only provide fine tuning.

The rotatable member may be a disc, ring or loop and, if it is of metal, it may vary the resonant frequency of the resonator during operation by disturbing the magnetic field therein. Alternatively it may be of a suitable dielectric material in which case it causes the electric field to be disturbed.

Figure 2:
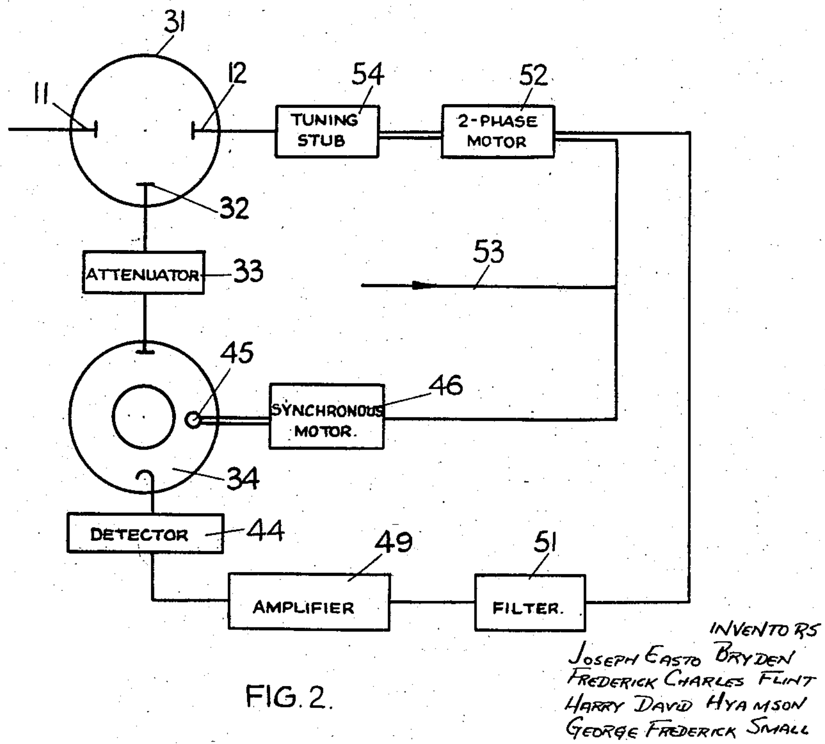
Figure 3:
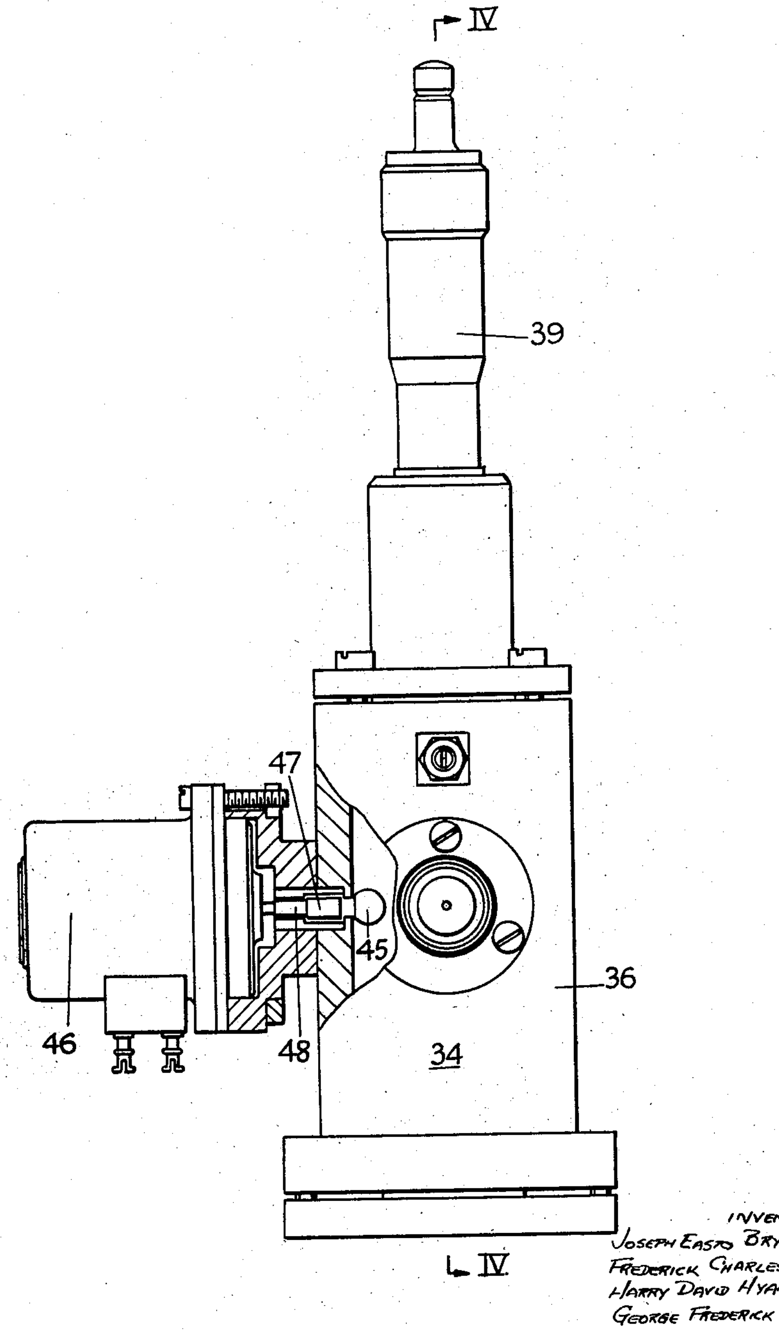
Figure 4:
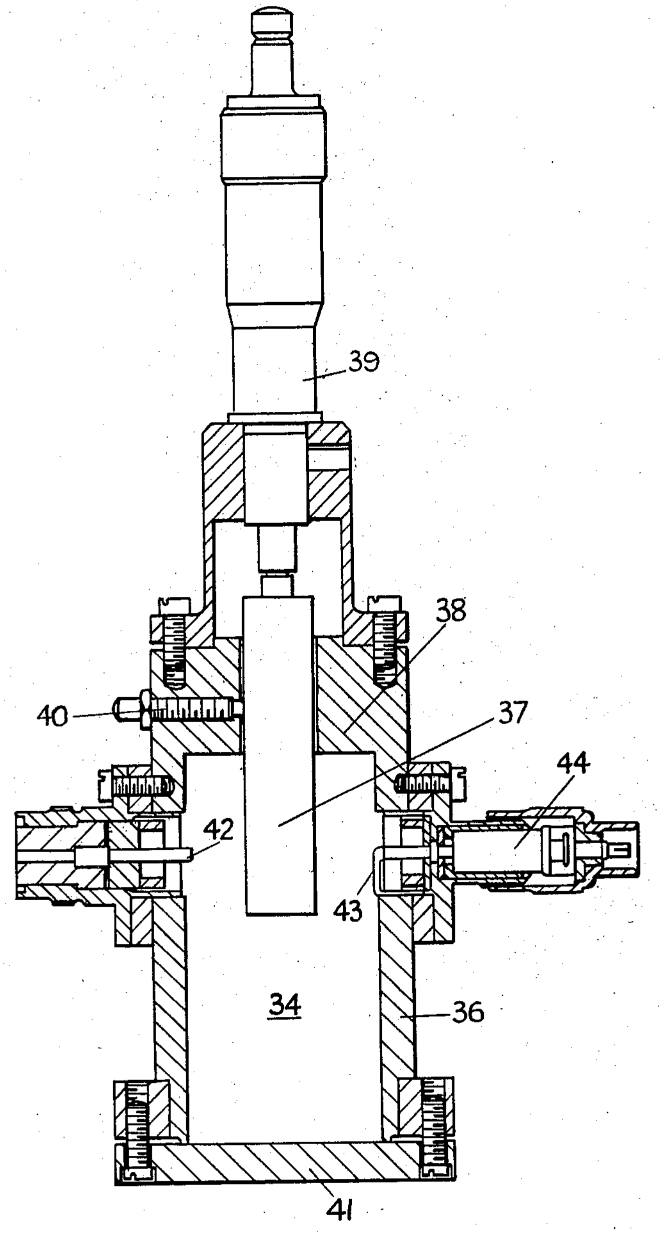

One arrangement of an oscillation generator for use at frequencies of the order of 2,000 megacycles per second will now be described by way of example with reference to the four figures of the accompanying drawings in which Figure 1 shows diagrammatically the electric circuit of the oscillator and the construction thereof, Figure 2 shows diagrammatically the automatic frequency control system, and Figures 3 and 4 show the construction of the resonator which provides the reference frequency of the frequency control system. Figure 3 is a side elevation of the complete resonator partly in section while Figure 4 is a cross-section at the line IV—IV in Figure 3. An electric motor associated with the resonator can also be seen in Figure 3 and a crystal detector which is connected to the resonator is also shown in Figure 4.

The generator comprises an oscillator which is adapted to operate at frequencies of the order of 2,000 megacycles per second. Referring now to Figure 1, the oscillator utilises a triode thermionic valve 1 having planar electrodes while its frequency of operation is determined by the effective length of co-axial lines 2, 3 and 4. In fact the inner conductor 5 of the co-axial line 2 is connected to the cathode of the valve 1 while its outer conductor 6 is effectively connected at the operating frequency of the oscillator to the grid. The co-axial line 3 surrounds this line 2, the outer conductor 6 of the line 2 forming the inner conductor of the line 3 while the outer conductor 7 of this line 3 is effectively connected at the operating frequency of the oscillator to the anode of the valve 1.

Shorting bridges 8 and 9 of the non-contact making type are provided between the conductors of the two co-axial lines 2 and 3 so that the effective electrical length of each line measured from the valve 1 may be varied for the purpose of tuning the oscillator. The bridge 8 may be moved by means of a rod 10 which passes through a block 15 of lossy dielectric material while the bridge 9 may be moved by means of studs 16

(only one of which can be seen in the drawing) of insulation material which project through the conductor 7. Two probes 11 and 12 project through the outer conductor 7 of the co-axial line 3 into the space between the inner and outer conductors of that line and the output signal from the generator is supplied by one of the probes 11 over a flexible co-axial transmission line 13. The co-axial line 4 is loosely coupled to the line 3 through the probe 12 and a flexible co-axial transmission line 14.

The co-axial line 4 comprises an inner conductor 17 and an outer conductor 18 between which there is arranged to be moved a shorting bridge 19 of the non-contact making type and the position of this bridge 19 is arranged to be moved as hereinafter described for the purpose of varying the effective length of the line 4 and thereby providing fine tuning of the oscillator. The bridge 19 comprises two low impedance sections 21 and 22 which are separated by a section 23 of relatively higher impedance while a ring 24 of lossy dielectric material is provided behind the section 22. The bridge 19 is supported by means of six buttons 25 of insulating material (only two of these buttons can be seen in the drawing) and by the ring 24 of lossy dielectric material. Movement of the bridge 19 is controlled through a member 26 which is free to move in a longitudinal slot in the outer conductor 18 of the co-axial line 4.

A third probe, which is not shown in Figure 1, projects through the outer conductor 7 of the co-axial line 3 and is used to supply a portion of the output of the oscillator to the resonator which constitutes the frequency reference of the automatic frequency control system. This probe is in the plane in which lie the probes 11 and 12 and which is perpendicular to the plane of Figure 1, this third probe being at right angles to the probes 11 and 12. Referring now to Figure 2, in which the anode circuit of the oscillator valve is shown by a circle 31, this figure shows the third probe 32 in addition to the probes 11 and 12. The portion of the output oscillation picked up by the probe 32 is passed through an attenuator 33 to the resonator 34.

Considering now the construction of the resonator 34 and referring to Figures 3 and 4, the resonator 34 comprises a hollow metal cylinder 36 which is closed at both ends to form a cavity and a metal rod 37 lying axially within the cylinder 36. This rod 37 passes through the end 38 of the cavity which is integral with the cylinder 36 and is effectively connected to that end of the cavity at the operating frequency of the oscillator, the rod 37 being accurately located by means of three studs 40 of insulating material. By means of a micrometer head 39 the amount of this rod 37 projecting into the cavity may be varied. The end of the rod 37 that is within the cavity is spaced an appreciable distance from the end plate 41 which is secured over the other end of the cylinder 36. The cylinder 36 and the rod 37 thus form a length of co-axial line which is short-circuited at one end and open-circuited at the other. At the resonant frequency of the resonator this line has an electrical length equal to one-quarter wavelength. The resonator has an input probe 42 which is connected to the attenuator 33 (Figure 2) while on the opposite side of the cylinder 36 there is provided a coupling loop 43 to which is connected a crystal detector 44.

The resonant frequency of the resonator 34 is arranged to be varied cyclically by rotating a copper disc 45 in the cavity at a speed of 25 revolutions per second. A synchronous electric motor 46 is provided for this purpose and a ceramic coupling 47 is provided between the disc 45 and the motor shaft 48 so as to minimize the leakage of field outside the cavity. The construction of the motor 46 is described more fully in the specification of co-pending British patent application No. 7,770/52.

Referring now again to Figure 2, the signal supplied by the detector 44 is passed through an amplifier 49 and a filter 41 having a stop frequency of 100 cycles per second to one phase winding of a two-phase electric motor 52. The other phase winding of this motor 52 is connected across the 50 cycle per second supply 53 to which is also connected the motor 46. The motor 52 is arranged to control the tuning stub 54, which is formed by the co-axial line 4 (Figure 1), through a rack and pinion mechanism (not shown).

Rotation of the disc 45 causes the resonant frequency of the resonator 34 to be varied over a range of frequencies, for example, 4 megacycles per second on either side of its mean frequency, fifty times a second while the angular position of the disc 45 is unambiguously determined at any instant by the phase of the alternating current supply 53. It will be realised that, when the frequency of the oscillation fed to the resonator 34 is equal to the mean resonant frequency thereof, there is substantially no component in the signal passed by the filter 51 to the motor 52 having a frequency of 50 cycles per second. There is, however, such a component when the mean resonant frequency of the resonator 34 differs from the frequency of the applied oscillation and the phasing of this component is arranged to be 90 electrical degrees leading or lagging on the alternating current supplied to the other winding of the motor 52 depending upon whether the frequency of the oscillation applied to the resonator 34 is greater or less than the mean resonant frequency. In order to obtain this relative phasing it may be necessary to phase-shift one of the signals supplied to the motor 52, for example, a phase-shift network may be provided between the filter 51 and the motor 52. Alternatively the motor 46 may be mounted so that the stator thereof can be turned relative to the resonator 34 for the purpose of obtaining this phase relationship.

Thus, when the frequency of the oscillation applied to the resonator 34 has a frequency that is equal to the mean resonant frequency thereof, the two-phase motor 52 is not operated. When, however, the frequency of the applied oscillation has some other value within the pull-in range of the frequency control system, the motor 52 is caused to operate and to vary the tuning of the oscillator in the correct direction to bring the frequency of the applied oscillation closer to the mean resonant frequency. The traverse speed of the bridge 19 is approximately 0.22 centimetre per second which corresponds to a rate of tuning of approximately 1.1 megacycles per second.

Since it is only practicable to effect fine tuning of the oscillator in this manner over a limited range of frequencies, mechanical stops may be provided to limit the travel of the shorting bridge 19 while a slip clutch may then be provided between the motor 52 and that bridge.

It will be appreciated that on first switching on the generator, the operating frequency of the oscillator may fall outside the range within which the automatic frequency control described above has effect. To overcome this difficulty, there may be provided means to supply alternating current to the two-phase motor in dependence upon there being no fundamental or second harmonic modulation components in the signal supplied by the crystal detector 44 so as slowly to tune the oscillator and bring it within the pull-in range of the frequency control system.

It will be appreciated that, although the embodiment described above makes use of a resonator of the enclosed co-axial line type, a cavity resonator could alternatively be used.

We claim:

An electric oscillation generator comprising electrical means to supply an electric oscillation, the electrical means having a tuning member the position of which determines the frequency of the oscillation supplied by the means, a resonator, an electric path to supply a portion of the electric oscillation from said electrical means to the resonator, a circular disc, means to mount said disc to lie wholly within the resonator, a synchronous electric motor arranged to rotate the said disc about a diameter thereof and thereby to cause the resonant frequency of the resonator to vary about a mean value, a two-phase electric motor having first and second phase windings, a mechanical coupling between the two-phase motor and the said tuning member, a detector connected in an electric path between the said resonator and the first phase winding of the two-phase motor, and means to supply alternating electric current to both the said synchronous motor and the second phase winding of the two-phase motor, whereby when an oscillation supplied by the said electrical means has a frequency equal to that of the mean resonant frequency of the resonator, there is no electric signal supplied to the first phase winding of the motor and the motor does not therefore drive the tuning member, while if these frequencies are unequal an electric signal which is derived by the detector is supplied to the first phase winding of the motor and the motor does drive the tuning member so as to bring the frequency of the oscillation supplied by the electrical means towards the mean resonant frequency of the resonator.

References Cited in the file of this patent

UNITED STATES PATENTS

| | | |
|---|---|---|
| 2,379,689 | Crosby | July 3, 1945 |
| 2,404,568 | Dow | July 23, 1946 |
| 2,521,700 | Dodington et al. | Sept. 12, 1950 |
| 2,564,005 | Halpern et al. | Aug. 14, 1951 |
| 2,611,092 | Smullin | Sept. 16, 1952 |
| 2,630,488 | Clogston | Mar. 3, 1953 |